United States Patent
Lee et al.

(10) Patent No.: US 8,514,599 B2
(45) Date of Patent: Aug. 20, 2013

(54) APPARATUS AND METHOD FOR CONTROLLING SWITCH OF FLYBACK CONVERTER FOR SOLAR GENERATING SYSTEM

(75) Inventors: Tae Won Lee, Gyunggi-do (KR); Doo Young Song, Gyunggi-do (KR); Ku Yong Kim, Gyunggi-do (KR); Jin Wook Kim, Seoul (KR); Chung Yuen Won, Gyunggi-do (KR); Young Ho Kim, Seoul (KR); Byoung Kuk Lee, Gyunggi-do (KR); Yong Hyok Ji, Gyunggi-do (KR); Don Sik Kim, Gyunggi-do (KR); Tae Hoon Kim, Gyunggi-do (KR)

(73) Assignees: Samsung Electro-Mechanics Co., Ltd, Gyunggi-Do (KR); Sungkyunkwan University, Gyunggi-Do (KR)

( * ) Notice: Subject to any disclaimer, the term of this patent is extended or adjusted under 35 U.S.C. 154(b) by 327 days.

(21) Appl. No.: 13/070,727

(22) Filed: Mar. 24, 2011

(65) Prior Publication Data
US 2012/0026758 A1   Feb. 2, 2012

(30) Foreign Application Priority Data
Jul. 29, 2010   (KR) ........................ 10-2010-0073650

(51) Int. Cl.
*H02M 5/42*   (2006.01)
(52) U.S. Cl.
USPC ................................. 363/95; 363/97; 323/906
(58) Field of Classification Search
USPC .................... 363/16–20, 21.07, 21.12, 21.08, 363/37, 41, 39, 95, 97, 127, 131; 323/282, 323/285, 276, 290, 299, 906; 320/130, 114, 320/140
See application file for complete search history.

(56) References Cited

U.S. PATENT DOCUMENTS

| | | | |
|---|---|---|---|
| 5,179,512 A  * | 1/1993 | Fisher et al. | 363/127 |
| 7,324,361 B2 * | 1/2008 | Siri | 363/95 |
| 7,714,561 B2 * | 5/2010 | Ge et al. | 323/285 |
| 7,796,412 B2 * | 9/2010 | Fornage | 363/97 |
| 8,125,798 B2 * | 2/2012 | Huynh et al. | 363/21.12 |

FOREIGN PATENT DOCUMENTS
KR   1020080048754   6/2008

* cited by examiner

*Primary Examiner* — Rajnikant Patel
(74) *Attorney, Agent, or Firm* — Lowe Hauptman Ham & Berner, LLP

(57) ABSTRACT

There is provided an apparatus and method for controlling a switch of a flyback converter for a solar generating system. The apparatus for controlling a switch of a flyback converter for a solar generating system includes: an MPPT controller generating a current command value for a maximum power point tracker of a solar cell module, based on input voltage, input current, and output voltage of the flyback converter; a current controller generating a current control signal for tracking the current command value; an output current command value generator generating the phase and magnitude command value of the output current, based on the phase of the output voltage and the current control signal; and a switch controller controlling the main switch of the flyback converter, based on the phase and magnitude command value of the output current, thereby simplifying a circuit while solving disadvantages of a discontinuous conduction mode and a boundary conduction mode.

24 Claims, 9 Drawing Sheets

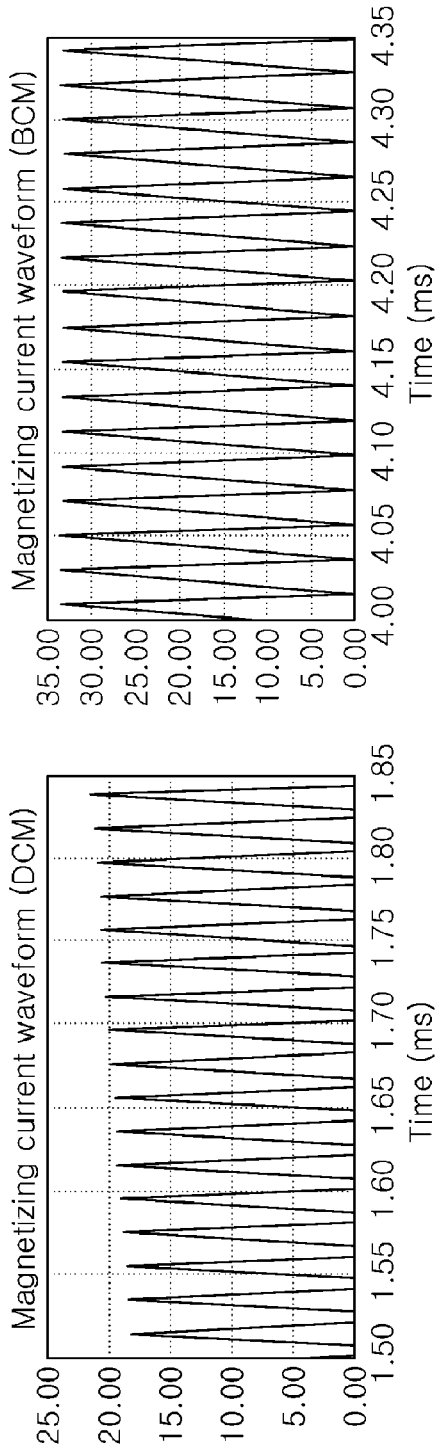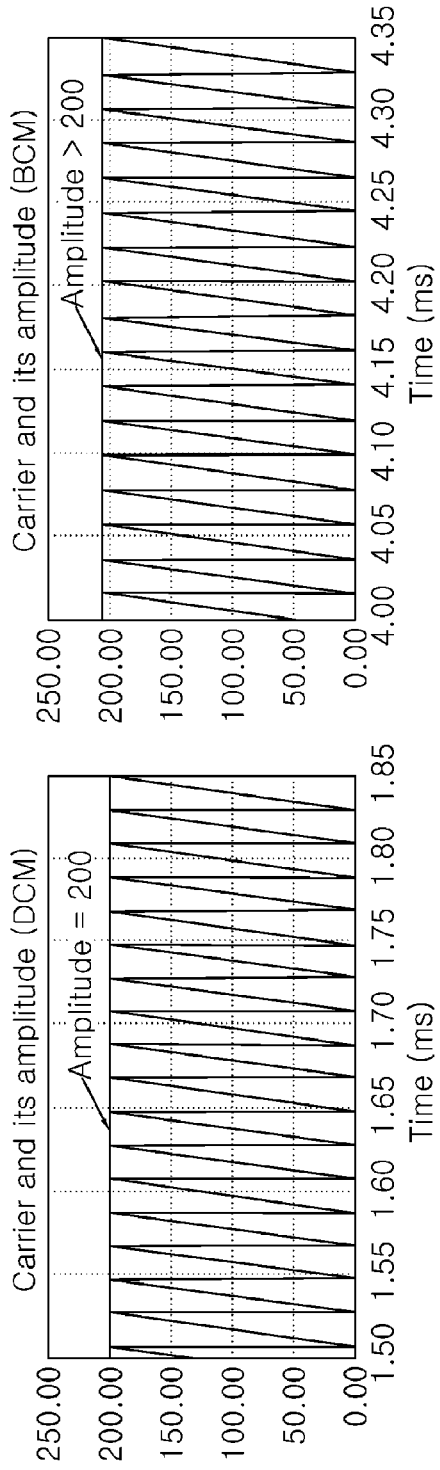

APPARATUS AND METHOD FOR CONTROLLING SWITCH OF FLYBACK CONVERTER FOR SOLAR GENERATING SYSTEM

CROSS-REFERENCE TO RELATED APPLICATIONS

This application claims the priority of Korean Patent Application No. 2010-0073650 filed on Jul. 29, 2010, in the Korean Intellectual Property Office, the disclosure of which is incorporated herein by reference.

BACKGROUND OF THE INVENTION

1. Field of the Invention

The present invention relates to an apparatus and method for controlling a switch of a flyback converter for a solar generating system, and more particularly, to an apparatus and method for controlling a switch of a flyback converter for a solar generating system capable of simplifying a circuit while solving disadvantages of a discontinuous conduction mode and a boundary conduction mode, by controlling a magnetizing current flowing into a transformer of a flyback converter in the discontinuous conduction mode or the boundary conduction mode, based on a predetermined conduction ratio limit value.

2. Description of the Related Art

Generally, a solar generating system implies a system that uses a solar cell to convert light energy into electrical energy. A general configuration of a solar generating system including a flyback converter is shown in FIG. 1. Referring to FIG. 1, the solar generating system is configured to include a power converter 20, such as a flyback converter, connected to a solar cell module 10 and a power grid 30 connected to an output stage of the power converter 20.

As shown in FIGS. 2A to 2B, in the solar cell module 10 used in the solar generating system, the amount of generated maximum power and the conditions (a maximum power point 11) generating maximum power are fluctuated according to insulation, peripheral temperature, or the like. In other words, FIG. 2A shows characteristics that the maximum power point 11 of the solar cell module 10 is increased with the increase in insulation and the maximum power point 11 of the solar cell module 10 is reduced with the increase in the peripheral temperature. Therefore, the power converter 20, such as a flyback converter for a solar cell alternating current generating system, should be designed to output a maximum output selected under various input conditions.

Meanwhile, the foregoing flyback converter 200 is controlled by a separate controller, wherein the controller controls a magnetizing current of a transformer by using a switch control method of a boundary conduction mode BCM and a discontinuous conduction mode DCM.

The discontinuous conduction mode is a switch control method discontinuously controlling the magnetizing current of the transformer. According to the discontinuous conduction mode, since the internally used carrier has a fixed frequency, the structure of the controller is simple. However, there is a problem in that the maximum power is limited by magnetizing inductance of a transformer. In order to overcome these disadvantages, a method to reduce the magnetizing inductance of the transformer is used, which has a problem in reducing conversion efficiency.

On the other hand, the boundary conduction mode BCM is a switch control method controlling the magnetizing current without generating a section in which the magnetizing current flowing into the transformer is continued to 0. Since the boundary conduction mode BCM controls the magnetizing current without generating a section where the magnetizing current is continued to 0, a switching frequency controlling a main switch is changed and a switching frequency is maximized in a specific portion. There is an advantage in that the change in the switching frequency does not limit the maximum output power according to the magnetizing inductance value of the transformer. However, there are problems in that a separate current detection circuit is required and a circuit for generating the switching signals is complicated. In addition, since the switching frequency is maximized in the specific portion, there is a problem in that switching loss and burning within the main switch may be caused.

SUMMARY OF THE INVENTION

An aspect of the present invention provides an apparatus and method for controlling a switch of a flyback converter for a solar generating system capable of simplifying a circuit while solving disadvantages of a discontinuous conduction mode and a boundary conduction mode.

Further, an aspect of the present invention provides an apparatus and method for controlling a switch of a flyback converter for a solar generating system capable of expanding an input voltage range of a flyback converter without changing a design of the flyback converter for the solar generating system.

According to an aspect of the present invention, there is provided an apparatus for controlling a switch of a flyback converter for a solar generating system, including: an MPPT controller generating a current command value for a maximum power point tracker of a solar cell module, based on input voltage, input current, and grid voltage of the flyback converter; a current controller generating a current control signal for tracking the current command value; an output current command value generator generating the phase and magnitude command value of the output current, based on the phase of the grid voltage and the current control signal; and a main switch controller controlling the main switch of the flyback converter, based on the phase and magnitude command value of the output current.

The main switch controller may control a magnetizing current flowing into the transformer of the flyback converter in a discontinuous conduction mode or a boundary conduction mode, based on a predetermined conduction ratio limit value.

The magnetizing current flowing into the transformer of the flyback converter may include a waveform of a discontinuous conduction mode in the case of less than that of the predetermined conduction ratio limit value and the waveform of the boundary conduction mode at the predetermined conduction ratio limit value or more.

The conduction ratio limit value may be determined by the following Equation, $$D_{LMT} = \frac{V_g}{n \times V_{in,max} + V_g}$$

where $D_{LMT}$ represents the conduction ratio limit value, $V_g$ represents the maximum value of the nominal voltage of the power grid connected to the output terminal of the flyback converter, n represents the turn ratio of the transformer, and $V_{in, max}$ represents the maximum value of the input voltage.

The output current command value generator may include: a phase detector detecting phase information of a power grid connected to the output terminal of the flyback converter from the grid voltage; a rectified sinusoidal wave generator generating the rectified sinusoidal wave having a frequency integer multiple larger than that of the power grid from the phase information; and a multiplier generating the phase and magnitude command value of the output current by multiplying the rectified sinusoidal wave by the current control signal.

The main switch controller may include: a carrier frequency modulator generating a carrier having a predetermined fixing frequency and magnitude in the case where the phase and magnitude of the output current is less than the conduction ratio limit value and a frequency-modulated carrier having a variable frequency and magnitude in the case where the phase and magnitude command value of the output current is the conduction ratio limit value or more; and a comparator comparing the carrier with the phase and magnitude command value of the output current to generate the PWM signal for controlling the main switch.

The carrier frequency modulator may include: an additional interrupting time calculator calculating an additional interrupting time for additionally turning-off the main switch base on the phase and magnitude command value of the output current and the conduction ratio limit value; and a carrier generator generating the carrier reflecting the additional interrupting time.

The additional interrupting time calculator may include: a conduction time calculator calculating a conduction time when the main switch is turned-on from the carrier having the phase and magnitude command value of the output current and the fixing frequency and magnitude; a switching period calculator calculating the switching period in a boundary conduction mode, based on the conduction time, the input voltage, the grid voltage, and the turn ratio of the transformer; and a calculator calculating the additional interrupting time from the switching period and the carrier period having the fixing frequency and magnitude.

The switching period may be calculated by the following Equation, $$T_{BCM} = \left(1 + \frac{nV_{in}}{V_{grid}}\right)t_{on}$$

where $T_{BCM}$ represents the switching period of the boundary conduction mode, n represents the turn ratio of the transformer, $V_{in}$ represents the input voltage, $V_{grid}$ represents the grid voltage, and $t_{on}$ represents the conduction time.

The additional interrupting time may be 0 when the phase and magnitude command value of the output current is less than the conduction ratio limit value and may be a value obtained by subtracting the carrier period having the fixing frequency and magnitude from the switching period when the phase and magnitude command value of the output current is the conduction ratio limit value or more.

The carrier may include a sawtooth wave.

According to another aspect of the present invention, there is provided a method for controlling a switch of a flyback converter for a solar generating system, including: (a) generating a current command value for tracking a maximum power point of a solar cell module, based on input voltage, input current, and grid voltage of the flyback converter; (b) generating a current control signal for tracking the current command value; (c) generating the phase and magnitude command value of the output current, based on the phase of the grid voltage and the current control signal; and (d) controlling a main switch of the flyback converter based on the phase and magnitude command value of the output current.

Step (d) may control the magnetizing current flowing into the transformer of the flyback converter in a discontinuous conduction mode or a boundary conduction mode, based on a predetermined conduction ratio limit value.

The magnetizing current flowing into the transformer of the flyback converter may include a waveform of a discontinuous conduction mode in the case of less than that of the predetermined conduction ratio limit value and the waveform of the boundary conduction mode at the predetermined conduction ratio limit value or more.

The conduction ratio limit value may be determined by the following Equation, $$D_{LMT} = \frac{V_g}{n \times V_{in,max} + V_g}$$

where $D_{LMT}$ represents the conduction ratio limit value, $V_g$ represents the maximum value of the nominal voltage of the power grid connected to the output terminal of the flyback converter, n represents the turn ratio of the transformer, and $V_{in,\ max}$ represents the maximum value of the input voltage.

Step (c) may include: (c1) detecting phase information of a power grid connected to the output terminal of the flyback converter from the grid voltage; (c2) generating the rectified sinusoidal wave having a frequency integer multiple larger than that of the power grid from the phase information; and (c3) generating the phase and magnitude command value of the output current by multiplying the rectified sinusoidal wave by the current control signal.

Step (d) may include: (d1) generating a carrier having a predetermined fixing frequency and magnitude in the case where the phase and magnitude of the output current is less than the conduction ratio limit value and a frequency-modulated carrier having a variable frequency and magnitude in the case where the phase and magnitude command value of the output current is the conduction ratio limit value or more; and (d2) comparing the carrier with the phase and magnitude command value of the output current to generate the PWM signal for controlling the main switch.

Step (d1) may include: (d11) calculating an additional interrupting time for additionally turning-off the main switch base on the phase and magnitude command value of the output current and the conduction ratio limit value; and (d12) generating the carrier reflecting the additional interrupting time.

Step (d11) may include: calculating a conduction time when the main switch is turned-on from the carrier having the phase and magnitude command value of the output current and the fixing frequency and magnitude; calculating the switching period in a boundary conduction mode, based on the conduction time, the input voltage, the grid voltage, and the turn ratio of the transformer; and calculating the additional interrupting time from the switching period and the carrier period having the fixing frequency and magnitude.

The switching period may be calculated by the following Equation, $$T_{BCM} = \left(1 + \frac{nV_{in}}{V_{grid}}\right)t_{on}$$

where $T_{BCM}$ represents the switching period of the boundary conduction mode, n represents the turn ratio of the transformer, $V_{in}$ represents the input voltage, $V_{grid}$ represents the grid voltage, and $t_{on}$ represents the conduction time.

The additional interrupting time may be 0 when the phase and magnitude command value of the output current is less than the conduction ratio limit value and may be a value obtained by subtracting the carrier period having the fixing frequency and magnitude from the switching period when the phase and magnitude command value of the output current is the conduction ratio limit value or more.

The carrier may include a sawtooth wave.

BRIEF DESCRIPTION OF THE DRAWINGS

The above and other aspects, features and other advantages of the present invention will be more clearly understood from the following detailed description taken in conjunction with the accompanying drawings, in which:

FIGS. 10A to 10D are diagrams showing a magnetizing current and a carrier of a boundary conduction mode and a discontinuous conduction mode according to the exemplary embodiment of the present invention.

DETAILED DESCRIPTION OF THE PREFERRED EMBODIMENT

Hereinafter, exemplary embodiments of the present invention will be described in detail with reference to the accompanying drawings so that they can be easily practiced by those skilled in the art to which the present invention pertains. Here, the accompanying drawings may be shown in a somewhat exaggerated manner for the description thereof, and may be merely provided as a reference without limiting the scope of the present invention.

Figure 3:
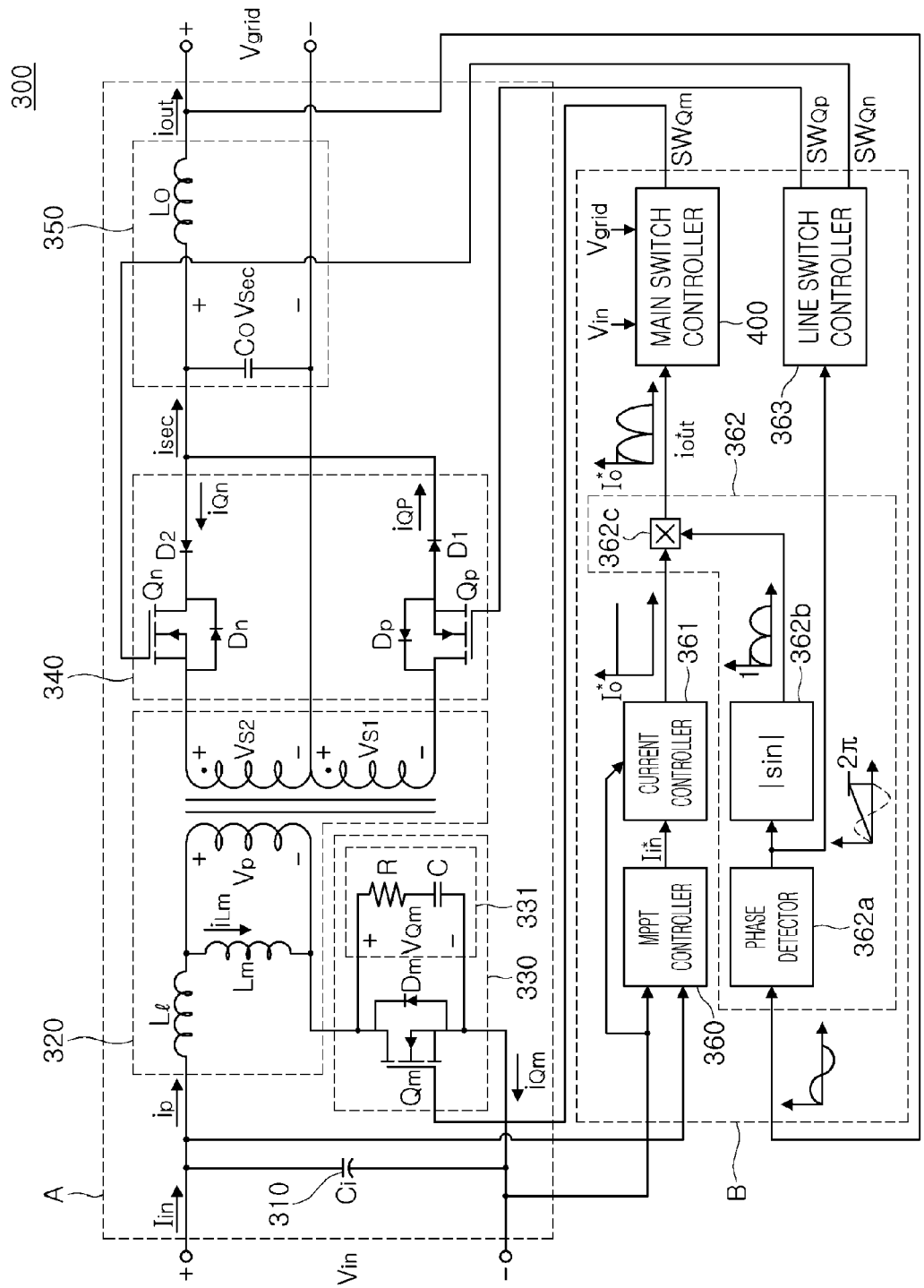
FIG. 3 is a configuration diagram of a switch controller for controlling a flyback converter according to an exemplary embodiment of the present invention.

FIG. 3 is a configuration diagram of a switch controller for controlling a flyback converter according to an exemplary embodiment of the present invention.

Reviewing a configuration of a flyback converter A with reference to FIG. 3, the flyback converter A is configured to include an input capacitor bank 310, a main switch set 330, a high frequency transformer 320, a line switch set 340, and an output filter unit 350.

The input capacitor bank 310 is configured by connecting several capacitors in parallel in order to smooth input voltage to be approximate to direct current by removing voltage ripples.

The main switch set 330 is configured to include a main switch $Q_m$ and a snubber circuit 331 for stabilizing the voltage of the main switch $Q_m$. The main switch $Q_m$ is switched to high frequency (several tens kHz to several hundreds kHz), such that the DC output input from the solar cell module is converted into an AC form, which is then transferred to the secondary side of the high frequency transformer 320. The snubber circuit 331 may be formed in various forms, but FIG. 3 shows the most general RC snubber circuit. The RC snubber circuit 331 is configured to include a snubber resistor R and a snubber capacitor C. The rated voltage of the main switch $Q_m$ is determined according to the capacity of the snubber capacitor C and the snubber resistor R serves to limit current at the time of discharging the snubber capacitor C.

The high frequency transformer 320 is formed of 3 wirings and a primary side thereof is connected between a positive terminal of the input capacitor bank 310 and the main switch set 330. A secondary side of the high frequency transformer 320 is formed of an intermediate tap form, wherein the intermediate tap is connected to a neutral point of an alternating power grid (see 30 of FIG. 1) and wirings other than the intermediate tap are connected to the line switch set 340.

Figure 1:
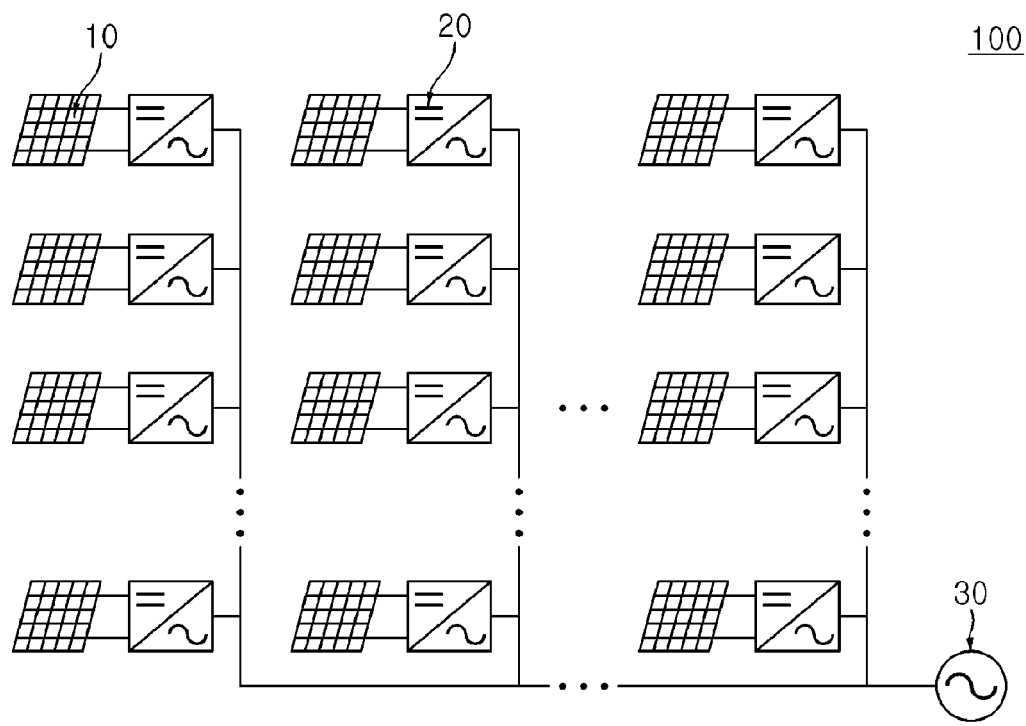
FIG. 1 is a diagram showing a general configuration of a solar generating system including a flyback converter.
Figure 2A:
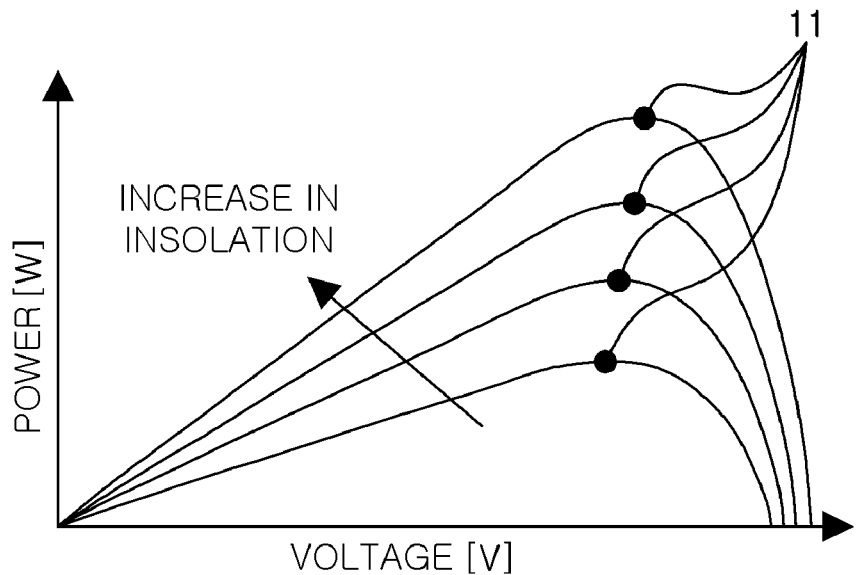
FIGS. 2A and 2B are diagrams showing fluctuation characteristics of a maximum power point of a solar cell module used in a solar generating system.
Figure 2B:
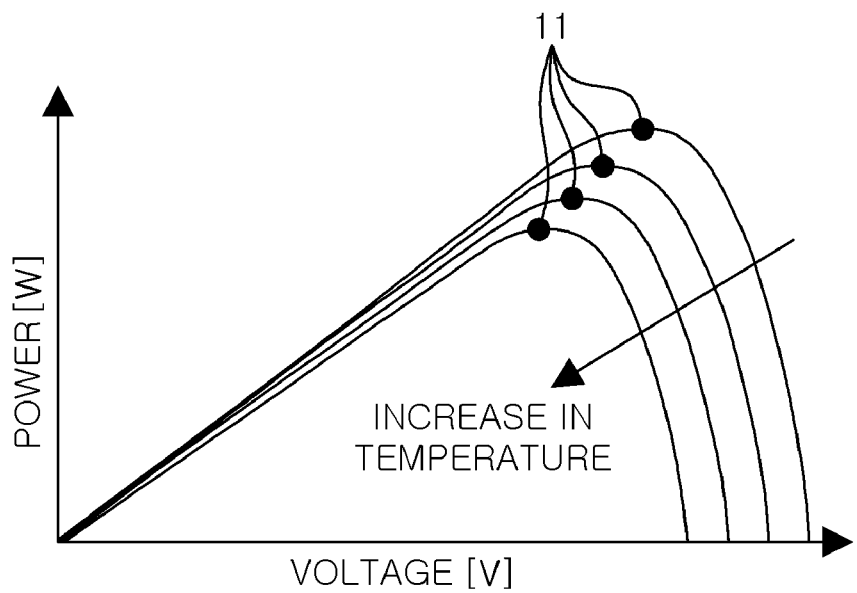

The line switch set 340 is switched in synchronization with the frequency of the alternating power grid (see 30 of FIG. 1) and the output current of the flyback converter A serves to control a direction of current so that the output current of the flyback converter A become in-phase with the alternating power grid voltage (see 30 of FIG. 1). The line switch set 340 is configured to include two switches $Q_p$ and $Q_n$ and two diodes $D_1$ and $D_2$. A forward alternating current switch $Q_p$ is conducted and a reverse alternating current switch $Q_n$ is interrupted for a positive half period of the alternating power grid system, such that current transferred through the high frequency transformer 320 flows into the output side through the forward alternating current switch $Q_p$ and the forward diode Dp by the switching of the main switch $Q_m$. The reverse alternating current switch $Q_n$ is conducted and the forward alternating current switch $Q_p$ is interrupted for a negative half period of the alternating power grid voltage, thereby changing the direction of current.

The output filter 350 is configured to include a filter capacitor Co and a filter inductor Lo and serves to smooth the high frequency current transferred to the secondary side of the high frequency transformer 320 into a low frequency (50 Hz to 60 Hz) corresponding to the frequency of the alternating power grid by the switching of the main switch $Q_m$. In the present invention, the output of the flyback converter B is connected to the alternating power grid 30 as shown in FIG. 1, such that the grid voltage of the flyback converter B is used herein to have the same meaning as the grid voltage.

Herein, non-explained reference numeral $V_{sec}$ represents the filter capacitor voltage, $i_{sec}$ represents the filter input current, $i_{out}$ represents the filter output current, Vout represents the grid voltage, $i_{Qn}$ represents the reverse current of the secondary side of the transformer, $i_{Qp}$ represents the forward current of the secondary side of the transformer, $L_1$ represents the leakage inductance of the transformer, $L_m$ represents the magnetizing inductance of the transformer, $i_{Lm}$ represents the magnetizing current of the transformer, $v_{Qm}$ represents the voltage of the main switch, $V_{in}$ represents the input voltage, $i_p$ represents the primary current of the transformer, and $V_p$ represents the primary voltage of the transformer.

Meanwhile, reviewing the configuration of the switch controller B according to the exemplary embodiment of the present invention, the switch controller B controls the turn-on/off of the switches $Q_m$, $Q_n$, and $Q_p$ of the flyback converter B so as to allow the flyback converter B to output the alternating current, which is in-phase with the voltage of the power grid 30, while tracking a maximum power point of the solar cell module.

Reviewing in more detail, the maximum power point tracker (MPPT) controller 360 uses information on detected input voltage $V_{in}$ and detected input current Iin to generate a current command value $I^*_{in}$ for tracking the maximum current point. The generated current command value $I^*_{in}$ is transferred to a current controller 361.

The current controller 361 receives the current command value $I^*_{in}$ from the MPPT controller 360 and generates a current control signal $I^*_n$ for tracking the current command value $I^*_{in}$. The generated current control signal $I^*_o$ is transferred to the output current command value generator 362.

The output current command value generator 362 is configured to include a phase detector 362a, a rectified sinusoidal wave generator 362b, and a multiplier 362c. Among others, the phase detector 362a detects a phase of the detected grid voltage $V_{grid}$ and transfers the phase of the detected grid voltage $V_{grid}$ to the rectified sinusoidal wave generator 362b. The rectified sinusoidal wave generator 362b generates a rectified sinusoidal wave having a frequency equal to twice that of the power grid (see 30 of FIG. 1), based on the grid voltage $V_{grid}$ transferred from the phase detector 362a. The generated rectified sinusoidal wave is transferred to the multiplier 362c. Finally, the multiplier 362c multiplies the rectified sinusoidal wave transferred from the rectified sinusoidal wave generator 362b by the current control signal $I^*o$ transferred from the current controller 361 to generate the phase and magnitude command value $i^*_{out}$ of the output current. The phase and magnitude command value $i^*_{out}$ of the generated output current is transferred to a main switch controller 400.

The main switch controller 400 generates the gate signal according to the phase and magnitude command value $i^*out$ of the output current transferred from the output current command value generator 362 to control a main switch set 330. The gate signal may be a pulse width modulation signal.

Meanwhile, a line switch controller 363 uses the phase of the grid voltage detected from the phase detector 362a to generate the gate signal, thereby controlling the line switch set 340. The detailed operation of the line switch controller 363 departs from the scope of the present invention and therefore, a detailed description thereof will be omitted.

Figure 4:
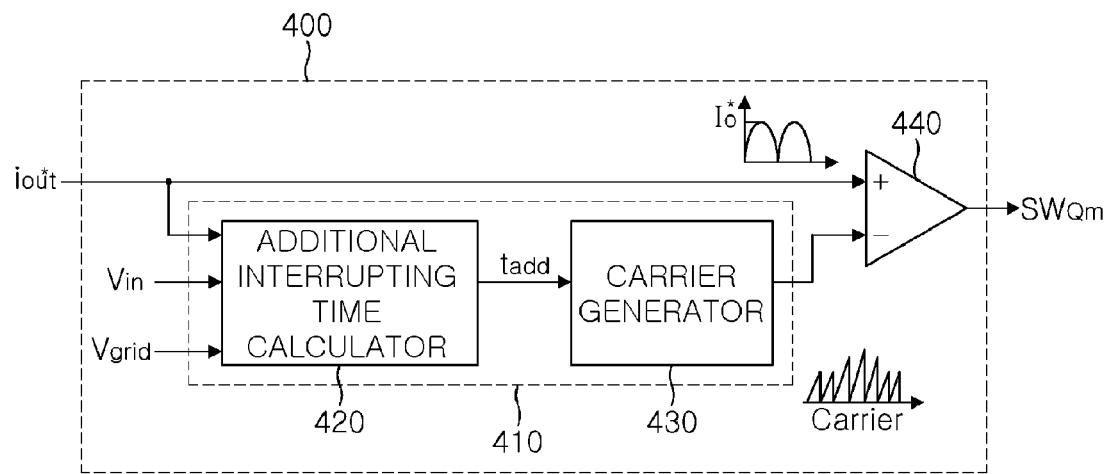
FIG. 4 is a configuration diagram of a main switch controller according to the exemplary embodiment of the present invention.

FIG. 4 is a configuration diagram of a main switch controller 400 according to the exemplary embodiment of the present invention.

Referring to FIG. 4, the main switch controller 400 includes a carrier frequency modulator 410 and a comparator 440, wherein the carrier frequency modulator 410 may include an additional interrupting time calculator 420 and a carrier generator 430.

In more detail, the additional interrupting time calculator 420 calculates an additional interrupting time $t_{add}$ based on the information on the phase and magnitude command value $i^*_{out}$ of the output current, the input voltage $V_{in}$, and the grid voltage $V_{grid}$. The calculated additional interrupting time $t_{add}$ is transferred to the carrier generator 430.

The carrier generator 430 receives the additional interrupting time $t_{add}$ from the additional interrupting time calculator 420 and reflects the transferred additional interrupting time $t_{add}$, thereby generating the carrier. The generated carrier is transferred to the comparator 440.

The comparator 440 compares the carrier transferred from the carrier generator 430 with the phase and magnitude command value $i^*_{out}$ of the output current, thereby generating the PWM signal for controlling the main switch $Q_m$.

Figure 5:
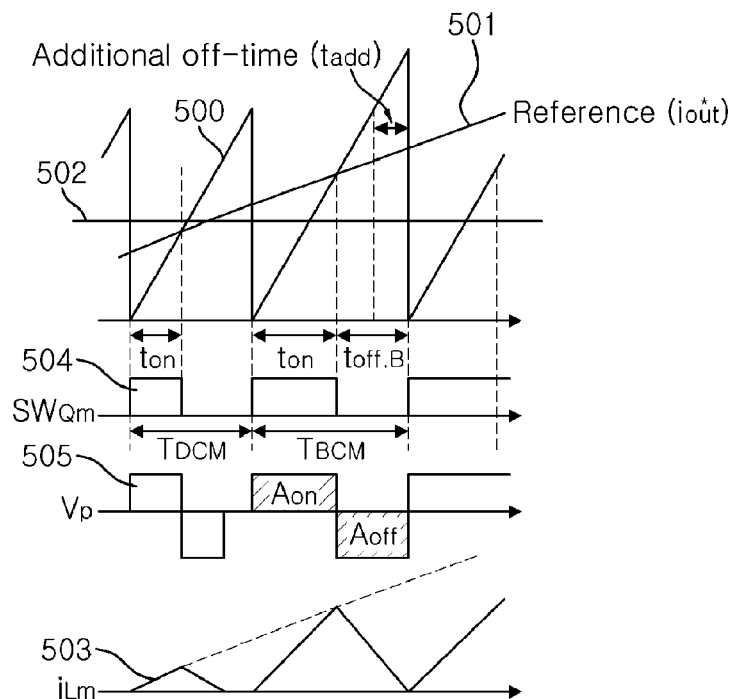
FIG. 5 is a diagram for explaining a switching control principle according to the exemplary embodiment of the present invention.

FIG. 5 is a diagram for explaining a switching control principle according to the exemplary embodiment of the present invention.

Referring to FIG. 5, the carrier frequency modulator 410 generates the carrier controlled in the discontinuous conduction mode in a section where the phase and magnitude command value $i^*_{out}$ of the output current is smaller than a predetermined conduction ratio limit value 502. The operation in this section is the same as that in the discontinuous conduction mode DCM and the carrier generator 430 generates the carrier having the predetermined fixing switching frequency. The conduction limit value may be calculated by the following Equation 1.

$$D_{LMT} = \frac{V_g}{n \times_{in,max} + V_g} \quad \text{Equation 1}$$

Where $D_{LMT}$ represents the conduction ratio limit value, $V_g$ represents the maximum value of the nominal voltage of the power grid connected to the output terminal of the flyback converter, n represents the turn ratio of the transformer, and $V_{in, max}$ represents the maximum value of the input voltage.

When the phase and magnitude command value $i^*_{out}$ of the output current is larger than the predetermined conduction ratio limit value 502, the carrier frequency modulator 410 generates the carrier controlled in the boundary conduction mode BCM. The switching frequency should be fluctuated for operating the boundary conduction mode BCM and the switching frequency variations in this section are determined by the additional interrupting time calculator 420.

As described above, it can be appreciated that a magnetizing current $i_{Lm}$ 503 is discontinuously operated when the phase and magnitude command value $i^*$out of the output current are smaller than the predetermined conduction ratio limit value 502 and it can be appreciated that when the phase and magnitude command value $i^*_{out}$ of the output current are larger than the predetermined conduction ratio limit value 502, the additional interrupting time $t_{add}$ is reflected to increase the switching period and the magnetizing current $i_{Lm}$ is thus operated in the boundary conduction mode BCM. Non-explained reference numeral $SW_{QM}$ represents the gate signal of the main switch, $T_{DCM}$ represents the carrier period used in the discontinuous conduction mode, $T_{BCM}$ is the carrier period used in the boundary conduction mode, $t_{on}$ is the conduction time (turn-on time) of the main switch $Q_m$, $t_{off}$ represents the turn-off time of the main switch $Q_m$, and $V_p$ represents the primary voltage of the transformer.

Meanwhile, the additional interrupting time t may be $t_{add}$ obtained from the fact that the energy accumulated in the magnetizing inductance $L_m$ becomes 0 for one period of the switching. In other words, the voltage applied to the magnetizing inductance $L_m$ for one period of the switching may be induced from the Volt-sec balance condition under which the integrated value becomes 0. In other words, $A_{on} = A_{off}$ should be satisfied for one period in a waveform of FIG. 5 and the additional interrupting time $t_{add}$ may be obtained therefrom.

The detailed configuration of the additional interrupting time calculator 420 for obtaining the additional interrupting time $t_{add}$ will be described below.

Figure 6:
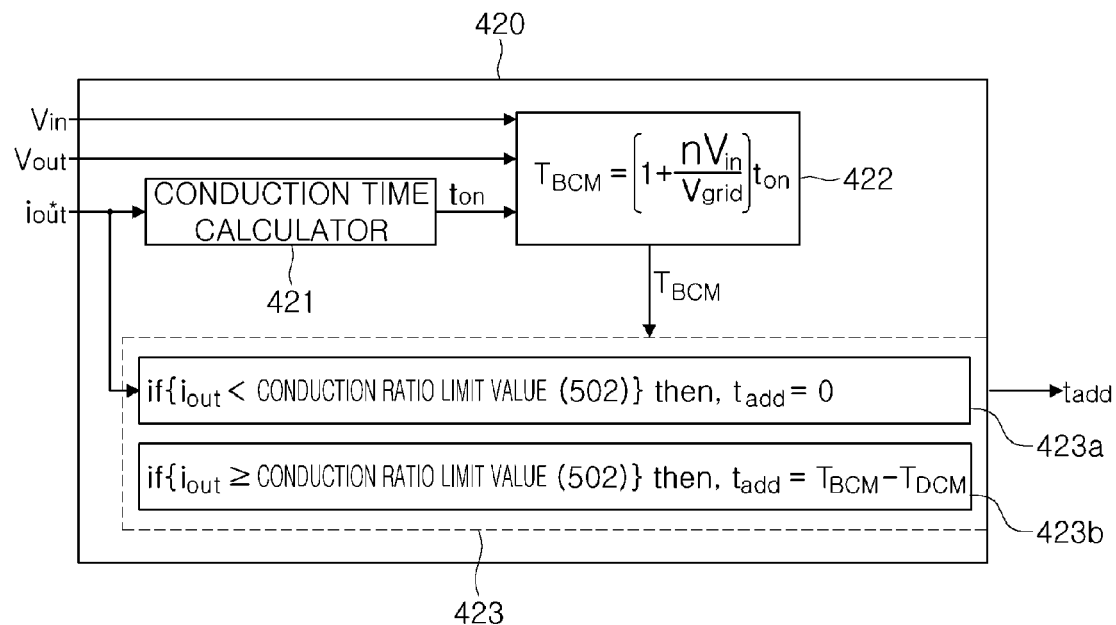
FIG. 6 is a configuration diagram showing a calculator of an additional interrupting time according to the exemplary embodiment of the present invention.

FIG. 6 is a configuration diagram of the additional interrupting time calculator 420 according to the exemplary embodiment of the present invention, wherein the additional interruption time calculator 420 may include a conduction time calculator 421, a switching period calculator 422, and a calculator 423.

Referring to FIG. 6, the conduction time calculator 421 calculates the conduction time $t_{on}$ based on the phase and magnitude command value $i^*_{out}$ of the output current and the carrier 500. The calculated conduction time $t_{on}$ is transferred to the switching period calculator 422.

The switching period calculator 422 calculates the switching period $T_{BCM}$ required when operated in the boundary conduction mode BCM from the following Equation 2 using the conduction time $t_{on}$ transferred from the conduction time calculator 421 and the input voltage $V_{in}$ and the grid voltage $V_{grid}$.

$$T_{BCM} = \left(1 + \frac{nV_{in}}{V_{grid}}\right) t_{on} \qquad \text{Equation 2}$$

where $T_{BCM}$ represents the switching period of the boundary conduction mode BCM, n represents the turn ratio of the transformer, $V_{in}$ represents the input voltage, $V_{grid}$ represents the grid voltage, and $t_{on}$ represents the conduction time.

Next, the calculator 423 is configured to include the calculator 423 that compares the phase and magnitude command value $i^*_{out}$ of the output current with the predetermined conduction ratio limit value 502 to calculate the additional interrupting time $t_{add}$.

In detail, the calculator 423 outputs (423a) the additional interrupting time $t_{add}$ as 0 when the phase and magnitude command value $i^*_{out}$ of the output current is less than the conduction ratio limit value 502 and calculates (423b) the additional interrupting time $t_{add}$ by subtracting the switching period $T_{DCM}$ of the predetermined basic discontinuous conduction mode DCM from the switching period $T_{BCM}$ of the calculated boundary conduction mode BCM in the switching period calculator 422 when the phase and magnitude command value $i^*_{out}$ of the output current is the conduction ratio limit value 502 or more.

Figure 7:
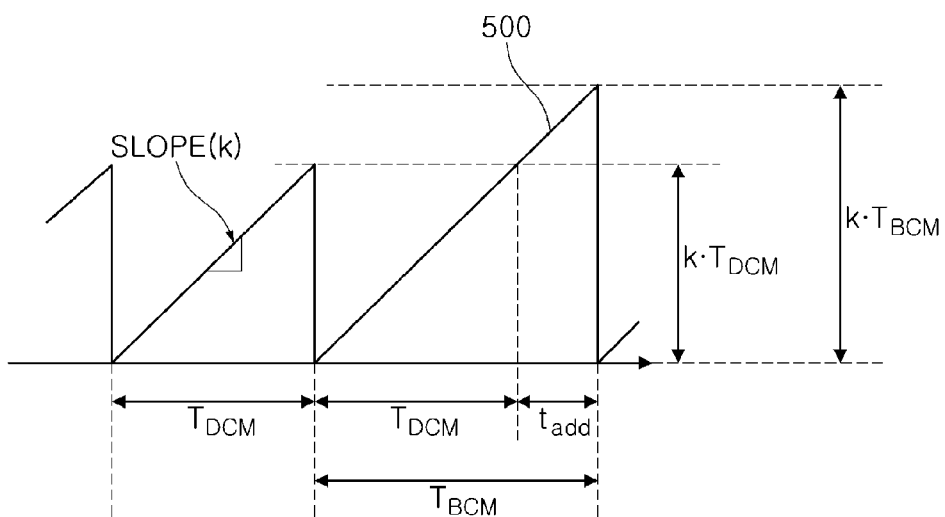
FIG. 7 is a diagram for explaining an operational principle of a carrier generating unit according to the exemplary embodiment of the present invention.

FIG. 7 is a diagram for explaining an operational principle of the carrier generating unit 430 according to the exemplary embodiment of the present invention.

Referring to FIG. 7, when the slope of the carrier 662 is k, the magnitude of the carrier 500 becomes a value $k \times T_{DCM}$ obtained by multiplying the slope k by the predetermined discontinuous conduction mode DCM switching period $T_{DCM}$ for the operational period of the discontinuous conduction mode DCM.

Generally, since the carrier generator 430 is configured of a counter, k=1. The additional interrupting time $t_{add}$ output from the additional interrupting time calculator 420 is reflected in the carrier generator 430 for the boundary conduction mode BCM period, such that the magnitude and the frequency of the carrier 500 may be modulated. The magnitude of the carrier 500 becomes a value $(k \times (T_{DCM} + t_{add}))$ obtained by multiplying the slope k by a value of adding the predetermined discontinuous conduction mode DCM switching period $T_{DCM}$ to the additional interrupting time $t_{add}$ boundary conduction mode BCM period.

Figure 8:
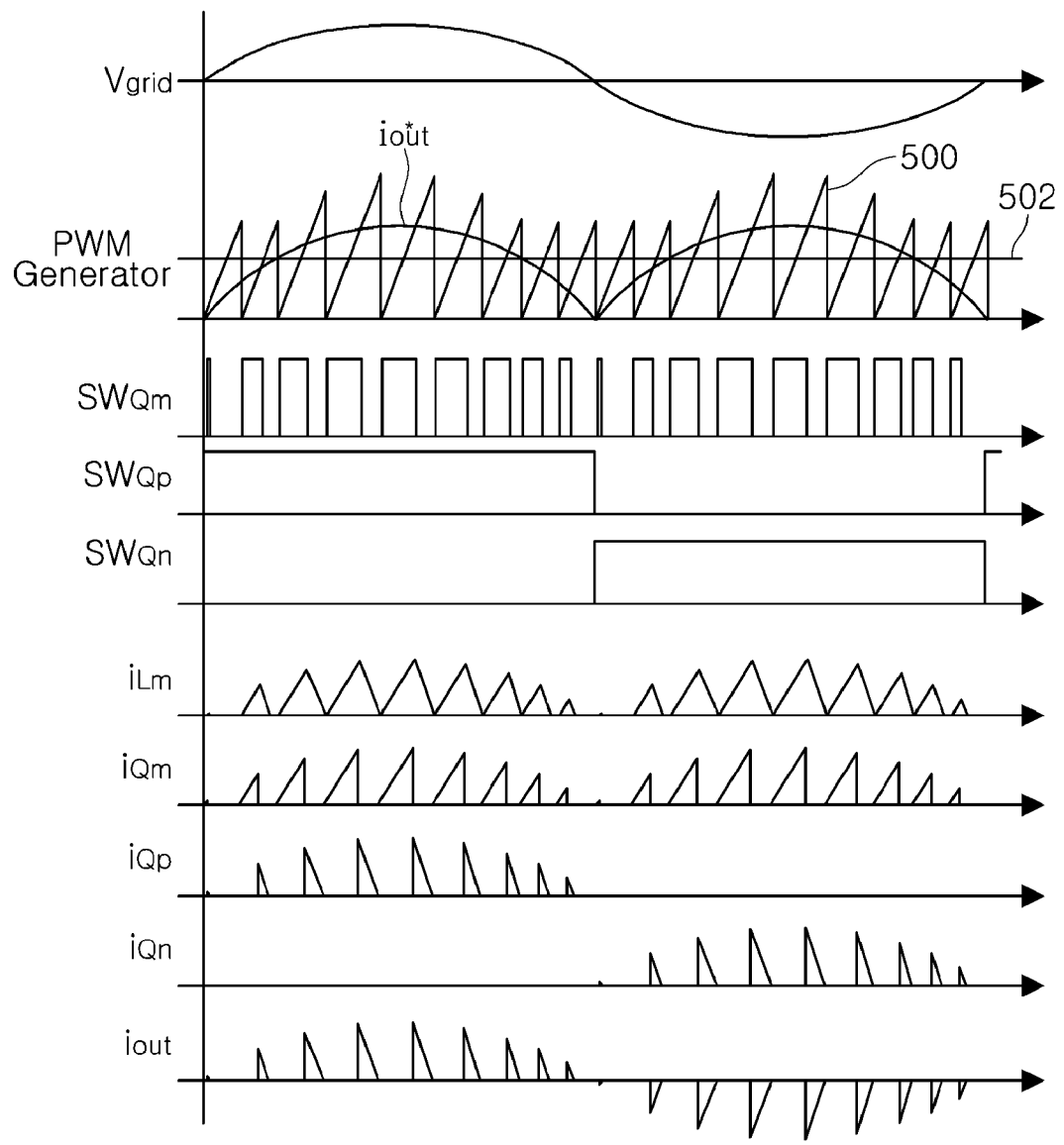
FIG. 8 is a diagram showing waveforms of each unit of the flyback converter and the switch controller according to the exemplary embodiment of the present invention.

FIG. 8 is diagrams showing waveforms of each unit of the flyback converter and the main controller according to the exemplary embodiment of the present invention.

As shown in FIG. 8, it can be appreciated that when the phase and magnitude command value $i^*_{out}$ of the output current is the conduction ratio limit value 502 or more, the magnetizing current $i_{Lm}$ of the transformer is operated in the boundary conduction mode BCM according to the gate signal of the main switch $Q_m$ according to the gate signal of the main switch $Q_m$ and when the phase and magnitude command value i*out of the output current is smaller than the conduction ratio limit value 502, the magnetizing current $i_{Lm}$ of the transformer is operated in the discontinuous conduction mode DCM according to the gate signal of the main switch $Q_m$.

FIG. 8 shows the waveform of the grid voltage Vgrid that is the grid voltage of the flyback converter, the phase and magnitude command value $i^*_{out}$ of the output current, the carrier 500, and the conduction ratio limit value 502, the gate signals SWQm and SWQp for controlling the line switch set 340 $Q_n$ and $Q_p$, current iQm flowing into the main switch $Q_m$, current iQn and iQp flowing into each switch $Q_n$ and $Q_p$ of the line switch set 340, and the output current iout.

Figure 9A:
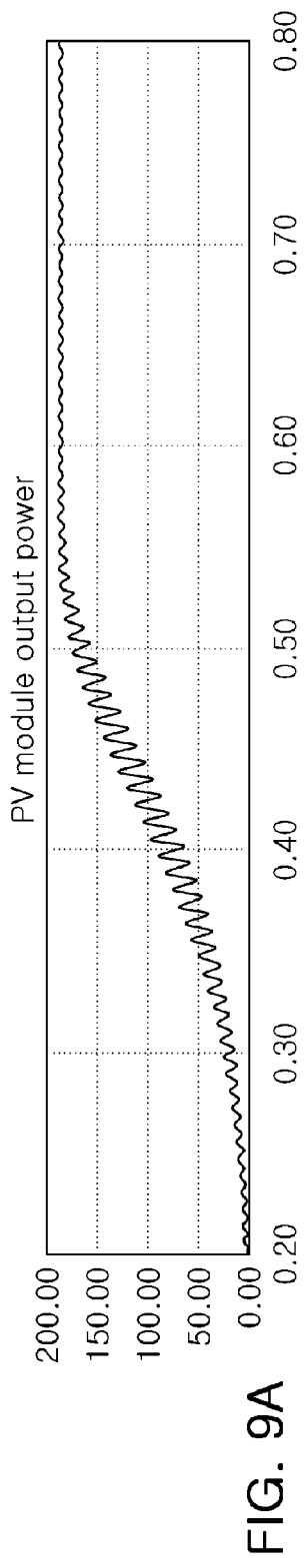
FIGS. 9A to 9C are diagrams showing waveforms of input/output voltage and current according to the exemplary embodiment of the present invention.
Figure 9B:
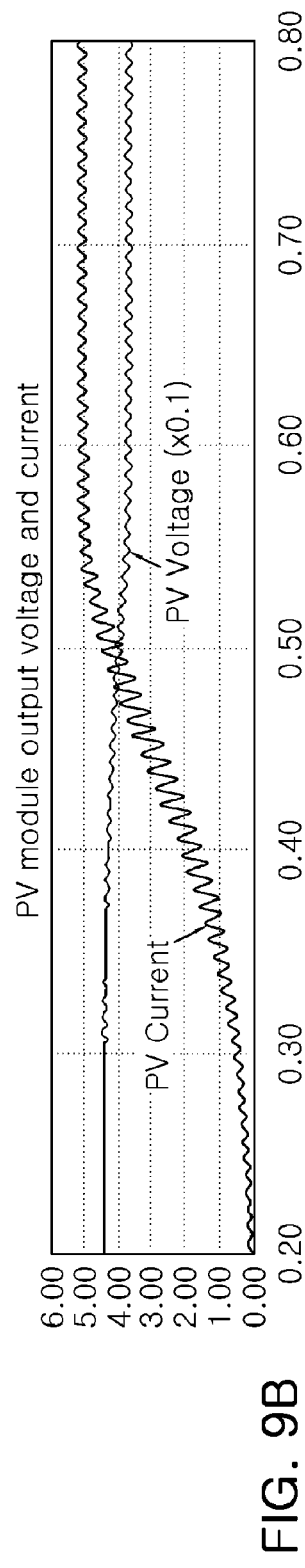
Figure 9C:
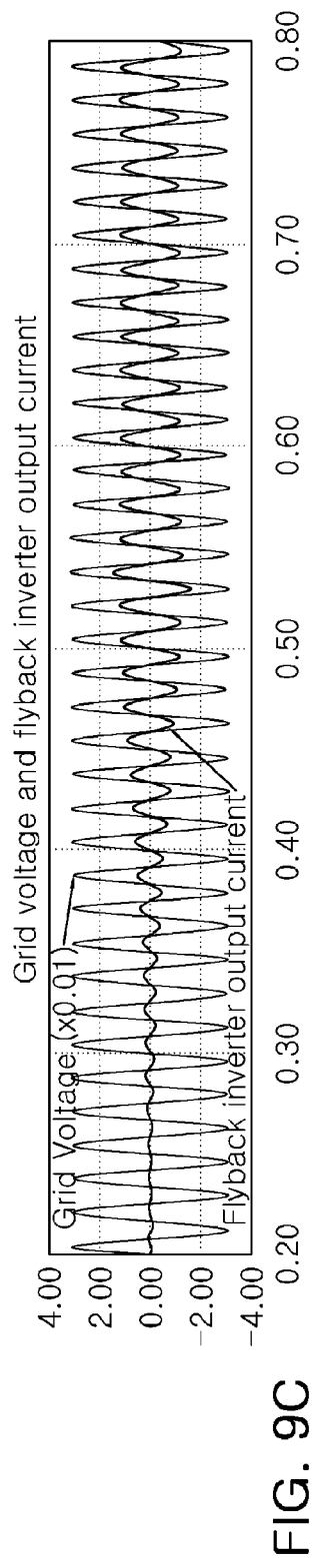

Meanwhile, FIGS. 9A to 9C are diagrams showing waveforms of the input/output voltage and current according to the exemplary embodiment of the present invention.

FIG. 9A shows the maximum power of the solar cell module, FIG. 9B shows the output voltage and the output current of the flyback converter, and FIG. 9C shows the phase relationship between the output voltage and the output current of the flyback converter.

As shown in FIGS. 9B and 9C, it can be appreciated that the product of the output voltage and the output current of the flyback converter tracks the maximum power of the solar cell module and the output current is increased by tracking the maximum power of the solar cell module. In addition, it can be appreciated from FIG. 9C that the phase of the output current of the flyback converter is the same as the phase of the output voltage to improve a power factor.

FIGS. 10A to 10D are diagrams showing the magnetizing current and the carrier of the boundary conduction mode and the discontinuous conduction mode according to the exemplary embodiment of the present invention.

FIG. 10A shows the waveform of the magnetizing current in the discontinuous conduction mode DCM, FIG. 10C shows the carrier in the discontinuous conduction mode DCM, FIG. 10B shows the waveform the magnetizing current in the boundary conduction mode BCM, and the FIG. 10D shows the carrier in the boundary conduction mode BCM.

It can be appreciated from FIG. 10A that the magnetizing current $i_{Lm}$ is discontinuous in the discontinuous conduction mode DCM and it can be appreciated from FIG. 10B that the magnetizing current $i_{Lm}$ is formed without the discontinuous section in the boundary conduction mode BCM. In addition, it can be appreciated from FIGS. 10B and 10C that the magnitude of the carrier in the boundary conduction mode BCM is larger than that of the carrier in the discontinuous conduction mode DCM.

Figure 11:
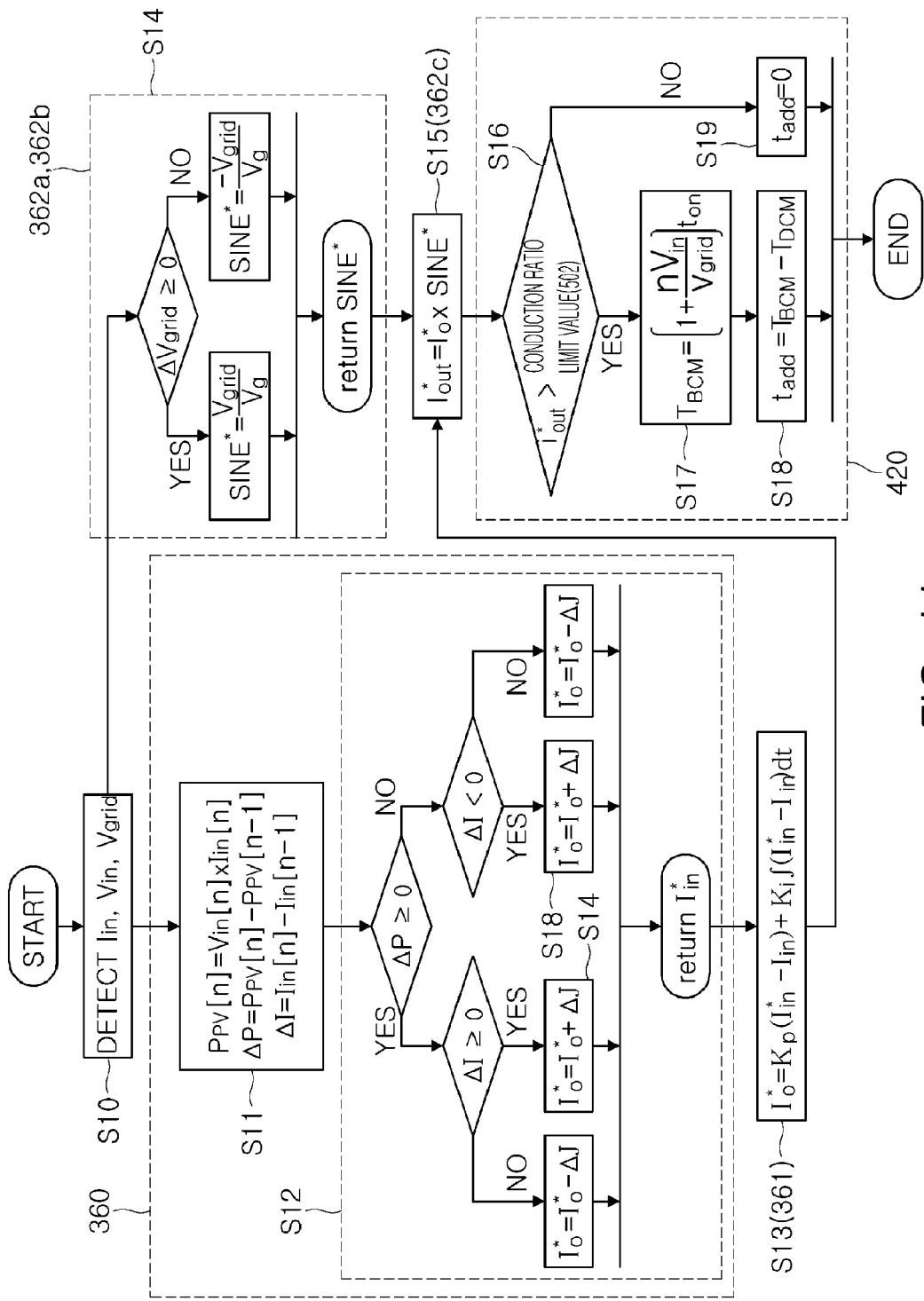
FIG. 11 is a flow chart showing a switch control method according to the exemplary embodiment of the present invention.

Finally, FIG. 11 is a flow chart showing the switch control method according to the exemplary embodiment of the present invention. In order to simplify the present invention, the description of parts overlapping with those described in FIGS. 1 to 10 will be omitted.

Referring to FIG. 11, the input current $I_{in}$, the input voltage $V_{in}$, and the grid voltage $V_{grid}$ of the flyback converter A are detected at step 10. The detected input current $I_{in}$, input voltage $V_{in}$, and grid voltage $V_{grid}$ are input to the MPPT controller 360.

Meanwhile, the process performed within the MPPT controller 360 in steps 11 and 12 is shown. That is, the MPPT controller 360 calculates the input power $P_{PV}$ from the detected input voltage $V_{in}$ and input current Iin (step 11) and uses the fluctuation width $\Delta P$ of the input power and the fluctuation width $\Delta I$ of the input current to generate the current command value $I^*_{in}$ for tracking the maximum power point. In order to generate the current command value $I^*_{in}$ for tracking the maximum power point, since the processes performed within the MPPT controller 360 use a perturbation and observation (P & O) method and the pre-known algorithm is used, a detailed description will be omitted.

Next, step 13 shows a process performed within the current controller 361. The PI controller is used in order to generate the current control signal $I^*_o$ for tracking the current command value $I^*_{in}$ for tracking the maximum power point transferred from the MPPT controller 360. The coefficients $K_p$ and $K_i$ of the PI controller may be properly selected if necessary. The current control signal I*o generated in step 13 is transferred to the multiplier 362c and is used to generate the phase and magnitude command value $i^*_{out}$ of the output current.

Meanwhile, step 14 shows a process performed in the phase detector 362a and the rectified sinusoidal wave generator 362b. In order to generate the rectified sinusoidal wave, a sign (−) is multiplied when the phase of the grid voltage $V_{grid}$ is minus, such that the rectified sinusoidal wave having a frequency equal to twice that of the grid voltage may be generated. Meanwhile, $V_g$ is a maximum value of a nominal voltage of the grid power connected to the output terminal of the flyback converter. As described above, the generated rectified sinusoidal wave is transferred to the multiplier 362c at step 14.

Step 15 shows a process performed in the multiplier 362c. In other words, the multiplier 362c multiplies the rectified sinusoidal wave transferred from the rectified sinusoidal wave generator 362b by the current control signal $I^*_o$ transferred from the current controller 361 to generate the phase and magnitude command value $i^*_{out}$ of the output current. The phase and magnitude command value $i^*_{out}$ of the generated output current is transferred to the main switch controller 400.

Finally, steps 16 to 19 show the main switch controller 400, in particular, the process performed within the additional interrupting time calculator 420.

During step 16, the additional interrupting time calculator 420 compares the phase and magnitude command value $i^*_{out}$ of the output current with the predetermined conduction ratio limit value 502. When the phase and magnitude command value $i^*_{out}$ of the output current is equal to that of the predetermined conduction ratio limit value 502 or more, it proceeds to step 17.

During step 17, the additional interrupting time calculator 420 calculates the switching period $T_{BCM}$ required when being operated as the boundary conduction mode BCM by Equation 2.

Thereafter, during step 18, the additional interrupting time calculator 420 subtracts the switching period $T_{DCM}$ of the predetermined basic discontinuous conduction mode DCM from the switching period $T_{BCM}$ required in the boundary conduction mode BCM to calculate the additional interrupting time $t_{add}$.

Meanwhile, during step 19, when the phase and magnitude command value $i^*_{out}$ of the output current is less than that of the conduction ratio limit value 502, the additional interrupting time calculator 420 sets the additional interrupting time $t_{add}$ to 0.

The additional interrupting time $t_{add}$ obtained through steps 16 to 19 may be used to generate the carrier controlled in the boundary conduction mode BCM or the discontinuous conduction mode DCM. As described in FIGS. 1 to 10, the magnetizing current $i_{Lm}$ of the transformer may be controlled in the discontinuous conduct mode DCM or the boundary conduction mode BCM according to the gate signal generated by comparing the generated carrier with the phase and magnitude command value $i^*_{out}$ of the output current.

As set forth above, the present invention sets the conduction ratio limit value having a predetermined value in advance and controls the magnetizing current of the transformer in the discontinuous conduction mode in the case where the phase and magnitude command value in output current is less than that of the predetermined conduction ratio limit value and controls the magnetizing current of the transformer in the boundary conduction mode in the case where the phase and magnitude command value in output current is the predetermined conduction ratio limit value or more, thereby making it possible to simplify the circuit while solving the disadvantages of the discontinuous conduction mode and the boundary conduction mode.

Further, the present invention controls the switching frequency of the main switch according to the input voltage without changing the design of the flyback converter for the solar generating system, thereby making it possible to expand the input voltage range of the flyback converter.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for controlling a switch of a flyback converter for a solar generating system, comprising:
    an MPPT controller generating a current command value for a maximum power point tracker of a solar cell module, based on input voltage, input current, and output voltage of the flyback converter;
    a current controller generating a current control signal for tracking the current command value;
    an output current command value generator generating the phase and magnitude command value of the output current, based on the phase of the output voltage and the current control signal; and
    a main switch controller controlling the main switch of the flyback converter, based on the phase and magnitude command value of the output current.

2. The apparatus for controlling a switch of a flyback converter for a solar generating system of claim 1, wherein the main switch controller controls a magnetizing current flowing into the transformer of the flyback converter in a discontinuous conduction mode or a boundary conduction mode, based on a predetermined conduction ratio limit value.

3. The apparatus for controlling a switch of a flyback converter for a solar generating system of claim 1, wherein the magnetizing current flowing into the transformer of the flyback converter includes a waveform of a discontinuous conduction mode in the case of less than that of the predetermined conduction ratio limit value and a waveform of the boundary conduction mode in the case of the predetermined conduction ratio limit value or more.

4. The apparatus for controlling a switch of a flyback converter for a solar generating system of claim 2, wherein the conduction ratio limit value is determined by the following Equation $$D_{LMT} = \frac{V_g}{n \times_{in,max} + V_g}$$

where $D_{LMT}$ represents the conduction ratio limit value, $V_g$ represents the maximum value of the nominal voltage of the power grid connected to the output terminal of the flyback converter, n represents the turn ratio of the transformer, and $V_{in,max}$ represents the maximum value of the input voltage.

5. The apparatus for controlling a switch of a flyback converter for a solar generating system of claim 2, wherein the output current command value generator includes:
 a phase detector detecting phase information of a power grid connected to the output terminal of the flyback converter from the output voltage;
 a rectified sinusoidal wave generator generating the rectified sinusoidal wave having a frequency integer multiple larger than that of the power grid from the phase information; and
 a multiplier generating the phase and magnitude command value of the output current by multiplying the rectified sinusoidal wave by the current control signal.

6. The apparatus for controlling a switch of a flyback converter for a solar generating system of claim 2, wherein the main switch controller includes:
 a carrier frequency modulator generating a carrier having a predetermined fixing frequency and magnitude in the case where the phase and magnitude command value of the output current is less than the conduction ratio limit value and a frequency-modulated carrier having a variable frequency and magnitude in the case where the phase and magnitude command value of the output current is the conduction ratio limit value or more; and
 a comparator comparing the carrier with the phase and magnitude command value of the output current to generate the PWM signal for controlling the main switch.

7. The apparatus for controlling a switch of a flyback converter for a solar generating system of claim 6, wherein the carrier frequency modulator includes:
 an additional interrupting time calculator calculating an additional interrupting time for additionally turning-off the main switch based on the phase and magnitude command value of the output current and the conduction ratio limit value; and
 a carrier generator generating the carrier reflecting the additional interrupting time.

8. The apparatus for controlling a switch of a flyback converter for a solar generating system of claim 7, wherein the additional interrupting time calculator includes:
 a conduction time calculator calculating a conduction time when the main switch is turned-on from the carrier having the phase and magnitude command value of the output current and the fixing frequency and magnitude;
 a switching period calculator calculating the switching period in a boundary conduction mode, based on the conduction time, the input voltage, the output voltage, and the turn ratio of the transformer; and
 a calculator calculating the additional interrupting time from the switching period and the carrier period having the fixing frequency and magnitude.

9. The apparatus for controlling a switch of a flyback converter for a solar generating system of claim 8, wherein the switching period is calculated by the following Equation $$T_{BCM} = \left(1 + \frac{nV_{in}}{V_{grid}}\right) t_{on}$$

where $T_{BCM}$ represents the switching period of the boundary conduction mode, n represents the turn ratio of the transformer, $V_{in}$ represents the input voltage, $V_{grid}$ represents the output voltage, and $t_{on}$ represents the conduction time.

10. The apparatus for controlling a switch of a flyback converter for a solar generating system of claim 9, wherein the additional interrupting time is 0 when the phase and magnitude command value of the output current is less than the conduction ratio limit value and is a value obtained by subtracting the carrier period having the fixing frequency and magnitude from the switching period when the phase and magnitude command value of the output current is the conduction ratio limit value or more.

11. The apparatus for controlling a switch of a flyback converter for a solar generating system of claim 6, wherein the carrier includes a sawtooth wave.

12. The apparatus for controlling a switch of a flyback converter for a solar generating system of claim 1, wherein the main switch controller includes:
 a carrier frequency modulator generating a carrier having the predetermined fixing frequency and magnitude in the case where the phase and magnitude command value of the output current is less than the conduction ratio limit value and a frequency modulated carrier having the variable frequency and magnitude in the case where the phase and magnitude command value of the output current is the conduction ratio limit value or more; and
 a comparator comparing the carrier with the phase and magnitude command value of the output current to generate the PWM signal for controlling the main switch.

13. A method for controlling a switch of a flyback converter for a solar generating system, comprising:
 (a) generating a current command value for tracking a maximum power point of a solar cell module, based on input voltage, input current, and output voltage of the flyback converter;
 (b) generating a current control signal for tracking the current command value;
 (c) generating the phase and magnitude command value of the output current, based on the phase of the output voltage and the current control signal; and
 (d) controlling a main switch of the flyback converter based on the phase and magnitude command value of the output current.

14. The method for controlling a switch of a flyback converter for a solar generating system of claim 13, wherein step (d) is controlling magnetizing current flowing into the transformer of the flyback converter in a discontinuous conduction mode or a boundary conduction mode, based on a predetermined conduction ratio limit value.

15. The method for controlling a switch of a flyback converter for a solar generating system of claim 13, wherein the magnetizing current flowing into the transformer of the flyback converter includes a waveform of a discontinuous conduction mode in the case of less than that of the predetermined conduction ratio limit value and the waveform of the boundary conduction mode in the case of the predetermined conduction ratio limit value or more.

16. The method for controlling a switch of a flyback converter for a solar generating system of claim 14, wherein the conduction ratio limit value is determined by the following Equation $$D_{LMT} = \frac{V_g}{n \times V_{in,max} + V_g}$$

where $D_{LMT}$ represents the conduction ratio limit value, $V_g$ represents the maximum value of the nominal voltage of the power grid connected to the output terminal of the flyback converter, n represents the turn ratio of the transformer, and $V_{in,max}$ represents the maximum value of the input voltage.

17. The method for controlling a switch of a flyback converter for a solar generating system of claim 14, wherein step (c) includes:
(c1) detecting phase information of a power grid connected to the output terminal of the flyback converter from the output voltage;
(c2) generating the rectified sinusoidal wave having a frequency integer multiple larger than that of the power grid from the phase information; and
(c3) generating the phase and magnitude command value of the output current by multiplying the rectified sinusoidal wave by the current control signal.

18. The method for controlling a switch of a flyback converter for a solar generating system of claim 14, wherein step (d) includes:
(d1) generating a carrier having a predetermined fixing frequency and magnitude in the case where the phase and magnitude command value of the output current is less than the conduction ratio limit value and a frequency-modulated carrier having a variable frequency and magnitude in the case where the phase and magnitude command value of the output current is the conduction ratio limit value or more; and
(d2) comparing the carrier with the phase and magnitude command value of the output current to generate the PWM signal for controlling the main switch.

19. The method for controlling a switch of a flyback converter for a solar generating system of claim 18, wherein step (d1) includes:
(d11) calculating an additional interrupting time for additionally turning-off the main switch based on the phase and magnitude command value of the output current and the conduction ratio limit value; and
(d12) generating the carrier reflecting the additional interrupting time.

20. The method for controlling a switch of a flyback converter for a solar generating system of claim 19, wherein step (d11) includes:
calculating a conduction time when the main switch is turned-on from the carrier having the phase and magnitude command value of the output current and the fixing frequency and magnitude;
calculating the switching period in a boundary conduction mode, based on the conduction time, the input voltage, the output voltage, and the turn ratio of the transformer; and
calculating the additional interrupting time from the switching period and the carrier period having the fixing frequency and magnitude.

21. The method for controlling a switch of a flyback converter for a solar generating system of claim 20, wherein the switching period is calculated by the following Equation $$T_{BCM} = \left(1 + \frac{nV_{in}}{V_{grid}}\right) t_{on}$$

where $T_{BCM}$ represents the switching period of the boundary conduction mode, n represents the turn ratio of the transformer, $V_{in}$ represents the input voltage, $V_{grid}$ represents the output voltage, and $t_{on}$ represents the conduction time.

22. The method for controlling a switch of a flyback converter for a solar generating system of claim 21, wherein the additional interrupting time is 0 when the phase and magnitude command value of the output current is less than the conduction ratio limit value and is a value obtained by subtracting the carrier period having the fixing frequency and magnitude from the switching period when the phase and magnitude command value of the output current is the conduction ratio limit value or more.

23. The method for controlling a switch of a flyback converter for a solar generating system of claim 18, wherein the carrier includes a sawtooth wave.

24. The method for controlling a switch of a flyback converter for a solar generating system of claim 13, wherein step (c) includes:
(c1) detecting phase information of a power grid connected to the output terminal of the flyback converter from the output voltage;
(c2) generating the rectified sinusoidal wave having a frequency integer multiple larger than that of the power grid from the phase information; and
(c3) generating the phase and magnitude command value of the output current by multiplying the rectified sinusoidal wave by the current control signal.

* * * * *